(12) United States Patent
John

(10) Patent No.: US 12,426,000 B2
(45) Date of Patent: Sep. 23, 2025

(54) SYSTEMS AND METHODS FOR PROVIDING A RADIO ACCESS NETWORK FALLBACK FOR MULTIMEDIA PRIORITY SERVICES

(71) Applicant: Verizon Patent and Licensing Inc., Basking Ridge, NJ (US)

(72) Inventor: Toby Varughese John, Murphy, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 496 days.

(21) Appl. No.: 17/931,245

(22) Filed: Sep. 12, 2022

(65) Prior Publication Data
US 2024/0089887 A1    Mar. 14, 2024

(51) Int. Cl.
*H04W 60/00* (2009.01)

(52) U.S. Cl.
CPC ................... *H04W 60/00* (2013.01)

(58) Field of Classification Search
CPC .................................................. H04W 60/00
USPC ........................................................ 455/435.1
See application file for complete search history.

(56) References Cited

U.S. PATENT DOCUMENTS

| | | | |
|---|---|---|---|
| 11,706,692 B2* | 7/2023 | Wei | H04L 63/101 455/435.1 |
| 11,737,045 B2* | 8/2023 | Yu | H04W 60/00 455/435.1 |
| 11,792,635 B2* | 10/2023 | Mildh | H04W 60/04 455/435.1 |
| 2023/0078563 A1* | 3/2023 | Salkintzis | H04W 60/04 455/435.1 |
| 2023/0116184 A1* | 4/2023 | Kweon | H04W 60/04 455/435.1 |
| 2023/0328677 A1* | 10/2023 | Nakarmi | H04W 12/37 455/435.1 |
| 2024/0089887 A1* | 3/2024 | John | H04W 60/00 |
| 2024/0292267 A1* | 8/2024 | Horio | H04W 40/22 |

FOREIGN PATENT DOCUMENTS

WO    WO-2006012908 A1 *    2/2006    .............. H04W 8/04

* cited by examiner

*Primary Examiner* — Qutbuddin Ghulamali

(57) ABSTRACT

A network device may receive, from a first radio access network (RAN), a first registration request associated with a first user device, and may determine, for the first registration request, first multimedia priority service (MPS) access indication parameters that are set to true for provision of MPSs to the first user device. The network device may generate a first registration accept message that includes the first MPS access indication parameters, and may provide the first registration accept message, with the first MPS access indication parameters, to the first user device to enable the first user device to utilize one of the MPSs on the first RAN.

20 Claims, 8 Drawing Sheets

First MPS access indication parameters

| Indicator | Description | Setting |
|---|---|---|
| *MPS-IMS-VoPS-3GPP* | MPS IMS voice or video over PS session supported over 3GPP access | True |
| *MPS-IMS-VoPS-N3GPP* | MPS IMS voice or video over PS session supported over non-3GPP access | True |
| *MPS-Data-3GPP* | MPS Data supported over 3GPP access | True |
| *MPS-Text-3GPP* | MPS Text supported over 3GPP access | True |

Second MPS access indication parameters

| Indicator | Description | Setting |
|---|---|---|
| *MPS-IMS-VoPS-3GPP* | MPS IMS voice or video over PS session supported over 3GPP access | False |
| *MPS-IMS-VoPS-N3GPP* | MPS IMS voice or video over PS session supported over non-3GPP access | False |
| *MPS-Data-3GPP* | MPS Data supported over 3GPP access | True |
| *MPS-Text-3GPP* | MPS Text supported over 3GPP access | True |

FIG. 1B

SYSTEMS AND METHODS FOR PROVIDING A RADIO ACCESS NETWORK FALLBACK FOR MULTIMEDIA PRIORITY SERVICES

BACKGROUND

Telecommunication network operators currently support prioritized services for priority subscribers (e.g., national security and emergency preparedness and public safety subscribers) for voice, data, and other services. Multimedia priority services (MPSs) enable priority subscribers to make priority calls. Design and feature implementations deployed in many networks provide priority to priority subscribers over normal users in a radio access network (RAN), RAN, an evolved packet core (EPC), and an Internet protocol (IP) multimedia subsystem (IMS). Although many RAN advancements improved accessibility for priority subscribers during an emergency or a crisis, accessibility and capacity bottlenecks remain for critical services.

BRIEF DESCRIPTION OF THE DRAWINGS

FIGS. 1A-1D are diagrams of an example associated with providing a RAN fallback for MPSs.

DETAILED DESCRIPTION OF EXAMPLE EMBODIMENTS

Figure 1A:
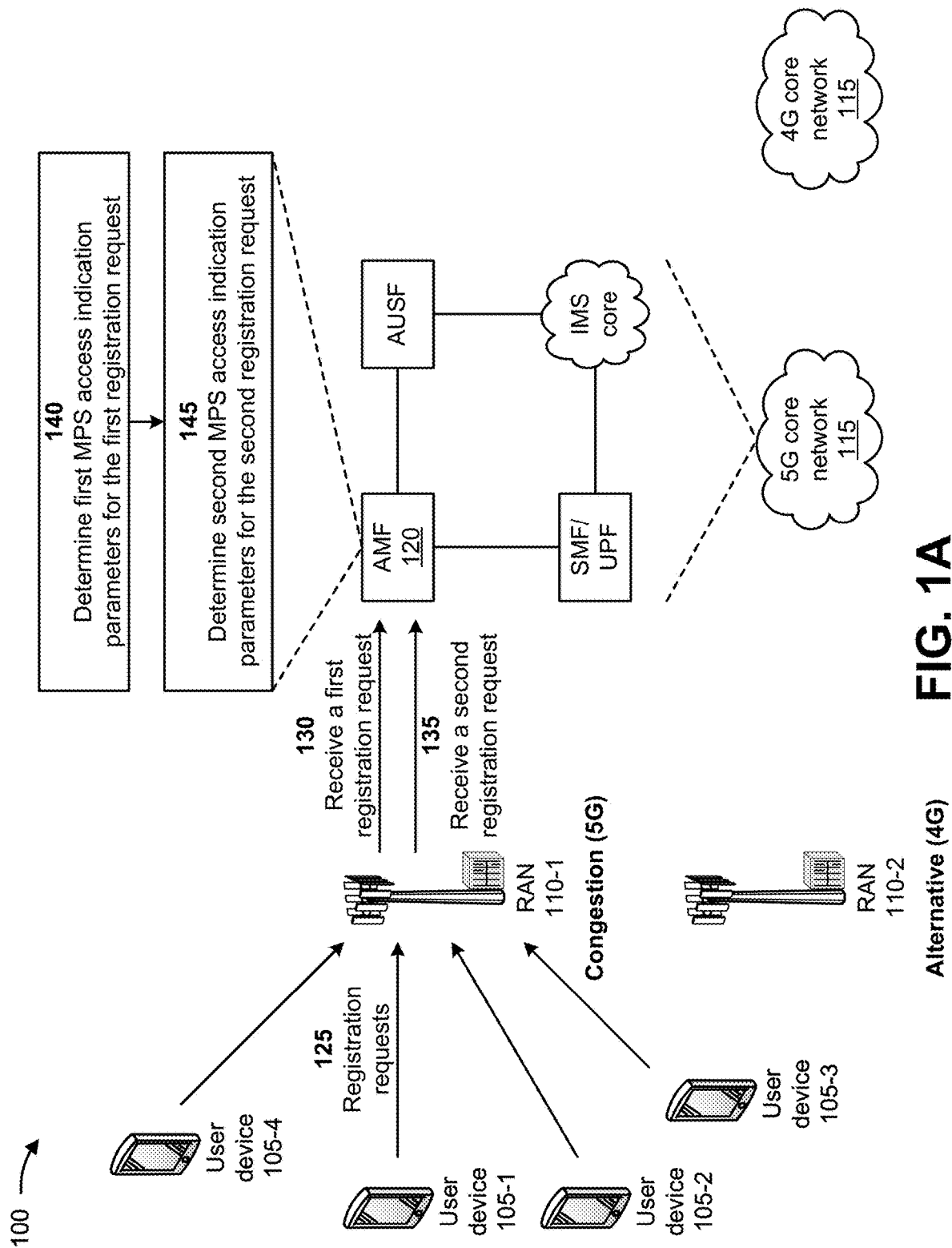

The following detailed description of example implementations refers to the accompanying drawings. The same reference numbers in different drawings may identify the same or similar elements.

Current telecommunication standards, specifications, and deployments do not fully address communication challenges for priority subscribers during a crisis, a natural disaster, or any event causing network congestion. During times of network congestion, priority subscribers may not be able to communicate with non-priority subscribers. As telecommunication network providers transition network technologies and services from a fourth generation (4G) to a fifth generation (5G), or from 5G to a sixth generation (6G), MPSs are negatively impacted. MPSs (e.g., IMS voice and video services) are typically implemented after a technology deployment is mature in a network. As a network transitions from 4G to 5G, all MPS service requests may be attempted on 5G and may subsequently transition to 4G via an evolved packet system (EPS) fallback mechanism. However, when MPS service requests transition to 4G, MPS sessions may fail since the EPS fallback mechanism is not prioritized. When voice over new radio (VoNR) is implemented and activated, 5G-capable user devices may attempt IMS voice and video sessions on 5G. However, the IMS voice and video sessions of the 5G-capable user devices (e.g., MPS subscribers with 5G-capable user device) will traverse the 5G network and flows and/or packets of the sessions will not be prioritized when MPS is not implemented in the 5G network.

Thus, current mechanisms for handling MPS sessions during any event causing network congestion consume computing resources (e.g., processing resources, memory resources, communication resources, and/or the like), networking resources, and/or other resources associated with causing user devices to place priority calls multiple times before connecting to MPSs, handling multiple priority calls from the same user devices, handling dropped priority calls, failing to connect to MPSs, and/or the like.

Some implementations described herein provide a network device (e.g., an access and mobility management function (AMF)) that provides a RAN fallback for MPSs. For example, the AMF may receive, from a first RAN, a first registration request associated with a first user device, and may determine, for the first registration request, first MPS access indication parameters that are set to true for provision of MPSs to the first user device. The AMF may generate a first registration accept message that includes the first MPS access indication parameters, and may provide the first registration accept message, with the first MPS access indication parameters, to the first user device to enable the first user device to utilize one of the MPSs on the first RAN.

In this way, the AMF provides a RAN fallback for MPSs. For example, the AMF may provide, to user devices, custom parameters for types of MPS services provided by the network (e.g., the AMF) during mobile registration by the user devices. The AMF may mitigate a failure risk for MPS services as networks evolve from 4G to 5G, from 5G to 6G, and/or the like by providing network support to user devices for various MPSs, such as voice, video, text, data, and/or the like. The AMF may enable network providers more flexibility in deploying and evolving networks while decreasing a risk of MPS failures. Thus, the AMF may conserve computing resources, networking resources, and/or other resources that would otherwise have been consumed by causing user devices to place priority calls multiple times before connecting to MPSs, handling multiple priority calls from the same user devices, handling dropped priority calls, failing to connect to MPSs, and/or the like.

Figure 2:
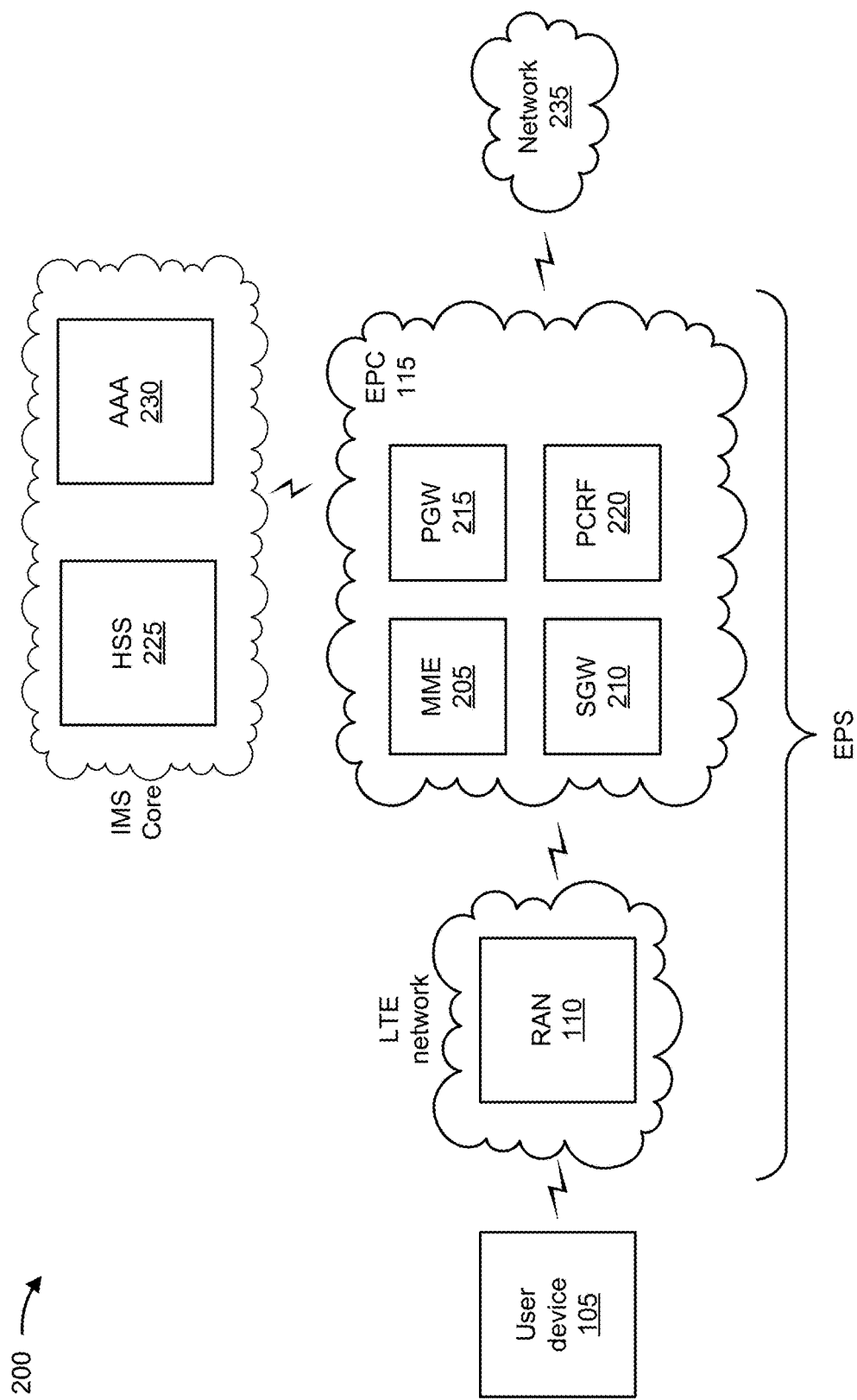
FIGS. 2 and 3 are diagrams of example environments in which systems and/or methods described herein may be implemented.
Figure 3:
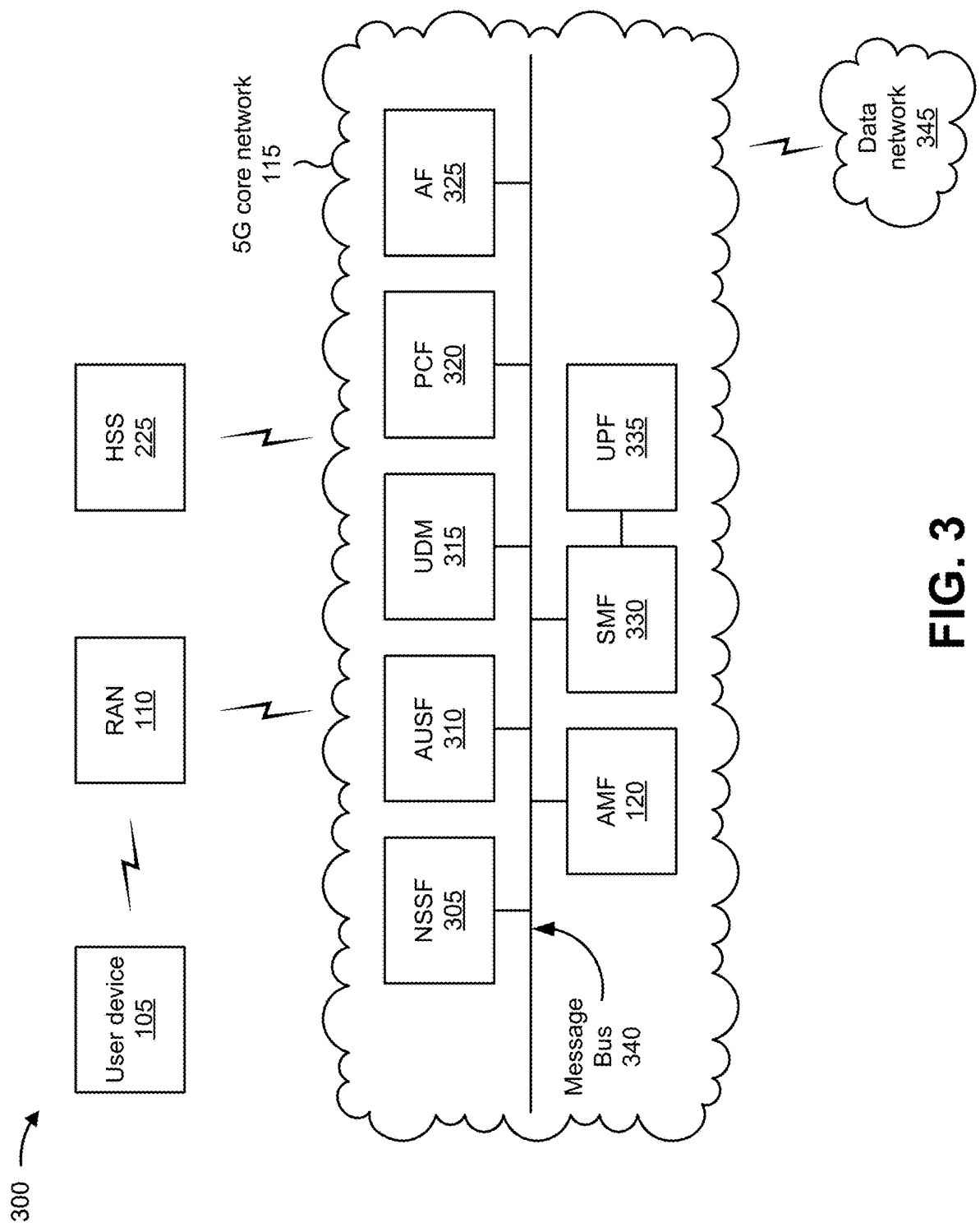

FIGS. 1A-1D are diagrams of an example 100 associated with providing a RAN fallback for MPSs. As shown in FIGS. 1A-1D, example 100 includes user devices 105-1, 105-2, 105-3, and 105-4 (referred to as user devices 105), a first RAN 110-1, a second RAN 110-2, a 5G core network 115, a 4G core network 115, and an IMS core. The 5G core network 115 may include an AMF 120, a session management function (SMF) and/or a user plane function (UPF), and an authentication server function (AUSF). Further details of the user devices 105, the RANs 110, the 5G core network 115, the 4G core network 115, the IMS core, the AMF 120, the SMF/UPF, and the AUSF are provided elsewhere herein. Further details of the 4G core network 115 are shown in FIG. 2 and further details of the 5G network core network 115 are shown in FIG. 3.

As shown in FIG. 1A, and by reference number 125, the user devices 105 may generate registration requests, and may provide the registration requests to the first RAN 110-1. For example, users may utilize the user devices 105 to input digits of telephone numbers, to access MPSs, to place a call, and/or the like. Some of the users may be priority subscribers that wish to utilize MPSs. The user devices 105 may generate calls to the telephone numbers based on the inputted digits, may attempt to access the MPSs, and/or the like. In some implementations, the telephone number may be associated with a priority service, such as an enhanced multimedia priority service, a government emergency telecommunications service (GETS), a GETS access number service, a GETS number translation service, an emergency 911 service, a suicide hotline, a police department, a fire department, a hospital, a poison control service, and/or the like. In some implementations, if the first RAN 110-1 receives a large quantity (e.g., hundreds, thousands, tens of thousands, and/or the like) of registration requests from the user devices 105 at the same time or during a same time period, the first RAN 110-1 may experience congestion and may not be able to handle all of the registration requests (e.g., even registration requests associated with priority subscribers).

As further shown in FIG. 1A, and by reference number 130, the AMF 120 may receive a first registration request from the first user device 105-1. For example, some subscribers associated with the user devices 105 may be priority subscribers to MPSs and should receive access to the MPSs over non-priority subscribers during times of network congestion. The priority subscribers should also be able to communicate with non-priority subscribers during times of network congestion. A first subscriber associated with the first user device 105-1 may be a priority subscriber and may cause the first user device 105-1 to generate the first registration request. The first user device 105-1 may provide the first registration request to the AMF 120, via the first RAN 110-1, and the AMF 120 may receive the first registration request. In some implementations, the first registration request may include data identifying the first subscriber, a request to utilize the MPSs, and/or the like.

As further shown in FIG. 1A, and by reference number 135, the AMF 120 may receive a second registration request from the second user device 105-2. For example, some subscribers associated with the user devices 105 may be non-priority subscribers and should not receive access to the first RAN 110-1 and the 5G core network 115 over priority subscribers during times of network congestion. A second subscriber associated with the second user device 105-2 may be a non-priority subscriber and may cause the second user device 105-2 to generate the second registration request. The second user device 105-2 may provide the second registration request to the AMF 120, via the first RAN 110-1, and the AMF 120 may receive the second registration request. In some implementations, the second registration request may include data identifying the first subscriber, a request to utilize the first RAN 110-1 and the 5G core network 115, and/or the like.

As further shown in FIG. 1A, and by reference number 140, the AMF 120 may determine first MPS access indication parameters for the first registration request. For example, the AMF 120 may analyze the first registration request and may identify the first subscriber as a priority subscriber to MPSs based on analyzing the first registration request. In some implementations, the AMF 120 may compare an identity of the first subscriber with a data structure (e.g., a database, a table, a list, and/or the like) that includes subscriber identities and data identifying whether the subscriber identities are associated with MPSs. In this example, the AMF 120 may determine that the first subscriber is a priority subscriber to MPSs based on comparing the identity of the first subscriber with the data structure.

The AMF 120 may determine the first MPS access indication parameters, for the first registration request, based on determining that the first subscriber is a priority subscriber to MPSs. In some implementations, the first MPS access indication parameters may include a first parameter indicating that the first user device 105-1 is provisioned for MPS IMS voice or video over a packet switched (PS) session supported over Third Generation Partnership Project (3GPP) access, a second parameter indicating that the first user device 105-1 is provisioned for MPS IMS voice or video over a PS session supported over non-3GPP access, a third parameter indicating that the first user device 105-1 is provisioned for MPS data supported over 3GPP access, a fourth parameter indicating that the first user device 105-1 is provisioned for MPS text supported over 3GPP access, and/or the like. In some implementations, the AMF 120 may set all of the first MPS access indication parameters to true to indicate that the first subscriber of the first user device 105-1 is a priority subscriber to the MPSs.

As further shown in FIG. 1A, and by reference number 145, the AMF 120 may determine second MPS access indication parameters for the second registration request. For example, the AMF 120 may analyze the second registration request and may identify the second subscriber as a non-priority subscriber based on analyzing the first registration request. In some implementations, the AMF 120 may compare an identity of the second subscriber with the data structure that includes subscriber identities and data identifying whether the subscriber identities are associated with MPSs. In this example, the AMF 120 may determine that the second subscriber is a non-priority subscriber for one or more MPSs based on comparing the identity of the second subscriber with the data structure.

The AMF 120 may determine the second MPS access indication parameters, for the second registration request, based on determining that the second subscriber is a non-priority subscriber for one or more MPSs. In some implementations, the second MPS access indication parameters may include a first parameter indicating that the second user device 105-2 is not provisioned for MPS IMS voice or video over a PS session supported over 3GPP access, a second parameter indicating that the second user device 105-2 is not provisioned for MPS IMS voice or video over a PS session supported over non-3GPP access, a third parameter indicating that the second user device 105-2 is not provisioned for MPS data supported over 3GPP access, a fourth parameter indicating that the second user device 105-2 is not provisioned for MPS text supported over 3GPP access, and/or the like. In some implementations, the AMF 120 may set one or more of the second MPS access indication parameters to false to indicate that the second subscriber of the second user device 105-2 is a non-priority subscriber to one or more corresponding MPSs.

FIG. 1B depicts an example of the first MPS access indication parameters and an example of the second MPS access indication parameters. As shown, the first MPS access indication parameters may include a first indicator (e.g., MPS-IMS-VoPS-3GPP) that is set to "True" and is associated with MPS IMS voice or video over PS session supported over 3GPP access; a second indicator (e.g., MPS-IMS-VoPS-N3GPP) that is set to "True" and is associated with MPS IMS voice or video over PS session supported over non-3GPP access; a third indicator (e.g., MPS-Data-3GPP) that is set to "True" and is associated with MPS Data supported over 3GPP access; and a fourth indicator (e.g., MPS-Text-3GPP) that is set to "True" and is associated with MPS Text supported over 3GPP access. As further shown, the second MPS access indication parameters may include a first indicator (e.g., MPS-IMS-VoPS-3GPP) that is set to "False" and is associated with MPS IMS voice or video over PS session supported over 3GPP access; a second indicator (e.g., MPS-IMS-VoPS-N3GPP) that is set to "False" and is associated with MPS IMS voice or video over PS session supported over non-3GPP access; a third indicator (e.g., MPS-Data-3GPP) that is set to "True" and is associated with MPS Data supported over 3GPP access; and a fourth indicator (e.g., MPS-Text-3GPP) that is set to "True" and is associated with MPS Text supported over 3GPP access. In some implementations, the first MPS access indication parameters and/or the second MPS access indication parameters may include an indicator for MPS text over non-access stratum (NAS) (e.g., text messages delivered over the NAS over a signaling/control plane path), a custom indicator defined by a configurable string for future services, and/or the like.

Figure 1C:
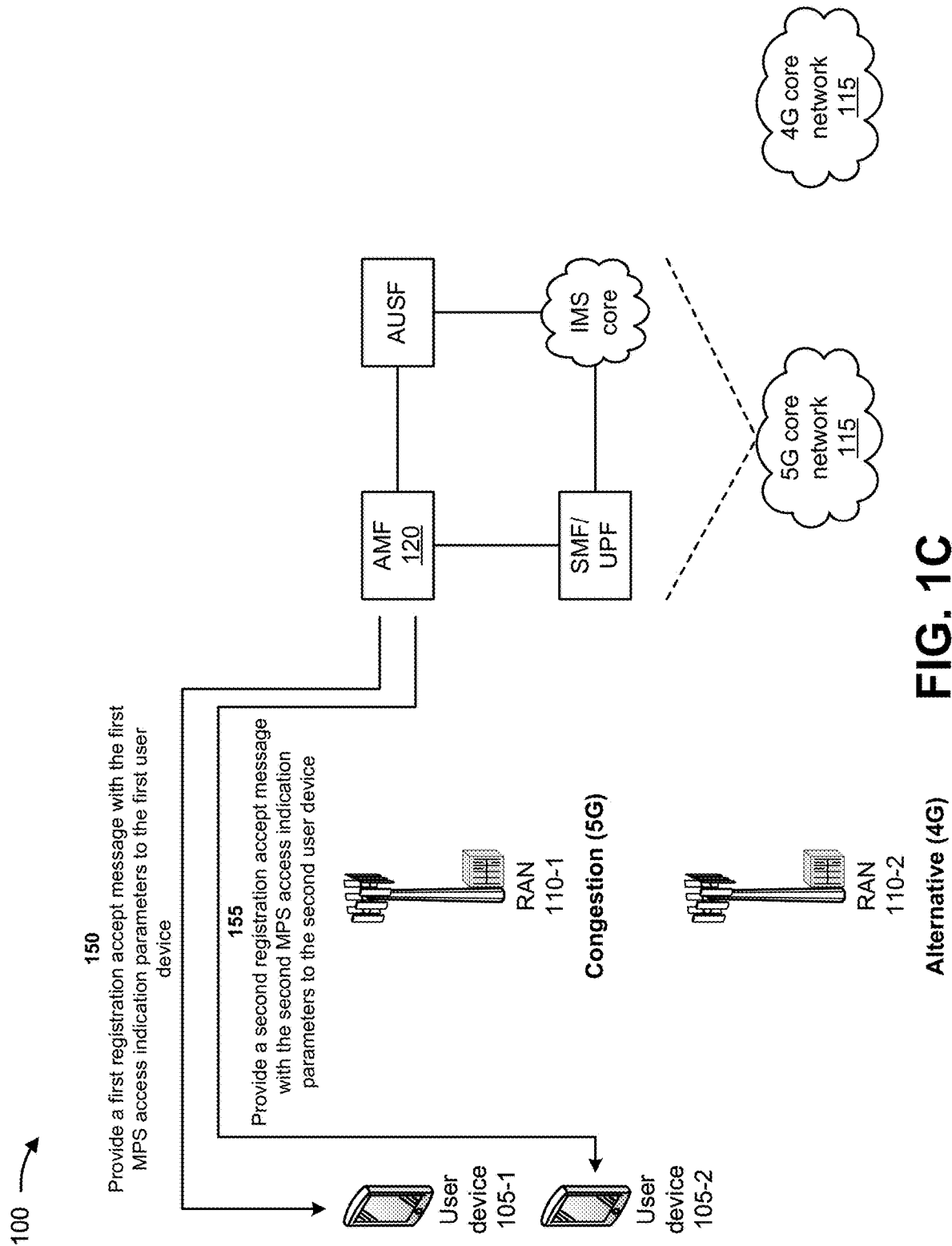

As shown in FIG. 1C, and by reference number 150, the AMF 120 may provide a first registration accept message with the first MPS access indication parameters to the first user device 105-1. For example, the AMF 120 may determine whether the first user device 105-1 is approved to register with the first RAN 110-1 and the 5G core network 115, and may generate the first registration accept (e.g., a message) when the first user device 105-1 is approved to register with the first RAN 110-1 and the 5G core network 115. The AMF 120 may include the first MPS access indication parameters in the first registration accept, and may provide the first registration accept to the first RAN 110-1. The first RAN 110-1 may provide the first registration accept, with the first MPS access indication parameters, to the first user device 105-1.

As further shown in FIG. 1C, and by reference number 155, the AMF 120 may provide a second registration accept message with the second MPS access indication parameters to the second user device. For example, the AMF 120 may determine whether the second user device 105-2 is approved to register with the first RAN 110-1 and the 5G core network 115, and may generate the second registration accept (e.g., a message) when the second user device 105-2 is approved to register with the first RAN 110-1 and the 5G core network 115. The AMF 120 may include the second MPS access indication parameters in the second registration accept, and may provide the second registration accept to the first RAN 110-1. The first RAN 110-1 may provide the second registration accept, with the second MPS access indication parameters, to the second user device 105-2.

Figure 1D:
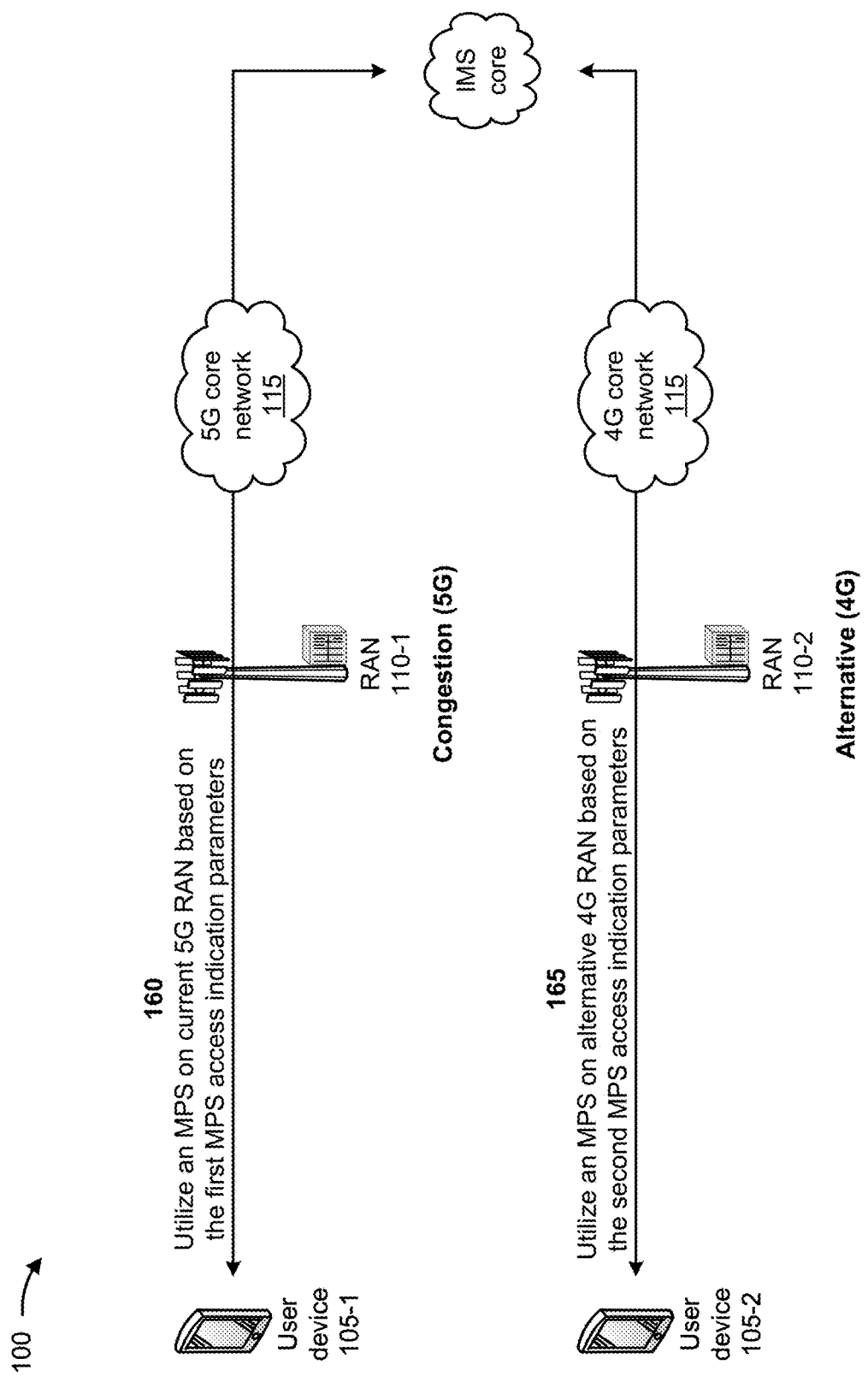

As shown in FIG. 1D, and by reference number 160, the first user device 105-1 may utilize one of the MPSs on a current 5G RAN (e.g., the first RAN 110-1) based on the first MPS access indication parameters. For example, the first user may utilize the first user device 105-1 to select one of the MPSs, such as one of MPS IMS voice or video over a PS session supported over 3GPP access, MPS IMS voice or video over a PS session supported over non-3GPP access, MPS data supported over 3GPP access, or MPS text supported over 3GPP access. The first user device 105-1 may utilize the selected MPS on the first RAN 110-1 based on the first MPS access indication parameters since the first user is a priority user and the first MPS access indication parameters are set to true. In some implementations, the first RAN 110-1 may prioritize utilization by the first user device 105-1 of the one of the MPSs on the first RAN 110-1 over non-priority communications.

As further shown in FIG. 1D, and by reference number 165, the second user device 105-2 may utilize one of the MPSs on an alternative 4G RAN (e.g., the second RAN 110-2) based on the second MPS access indication parameters. For example, the second user may utilize the second user device 105-2 to select one of the MPSs, such as one of MPS IMS voice or video over a PS session supported over 3GPP access, MPS IMS voice or video over a PS session supported over non-3GPP access, MPS data supported over 3GPP access, or MPS text supported over 3GPP access. However, the second user device 105-2 may not utilize the selected MPS on the first RAN 110-1 based on the second MPS access indication parameters since at least one of the MPS access indication parameters is set to false. Since at least one of the MPS access indication parameters is set to false, the second user device 105-2 may a session over the alternative 4G RAN (e.g., the second RAN 110-2). The second RAN 110-2 may enable the second user device 105-2 to utilize MPSs that are prioritized from an end-to-end perspective.

In this way, the AMF 120 provides a RAN fallback for MPSs. For example, the AMF 120 may provide, to user devices 105, custom parameters for types of MPS services provided by the network (e.g., the AMF 120) during mobile registration by the user devices 105. The AMF 120 may mitigate a failure risk for MPS services as networks evolve from 4G to 5G, from 5G to 6G, and/or the like by providing network support to user devices 105 for various MPSs, such as voice, video, text, data, and/or the like. The AMF 120 may enable network providers more flexibility in deploying and evolving networks while decreasing a risk of MPS failures. Thus, the AMF 120 may conserve computing resources, networking resources, and/or other resources that would otherwise have been consumed by causing user devices 105 to place priority calls multiple times before connecting to MPSs, handling multiple priority calls from the same user devices 105, handling dropped priority calls, failing to connect to MPSs, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

FIG. 2 is a diagram of an example environment 200 in which systems and/or methods, described herein, may be implemented. As shown in FIG. 2, the environment 200 may include the user device 105, the RAN 110, and the 4G core network 115 (e.g., which may be an EPC 115). The 4G core network 115 may include a mobility management entity device (MME) 205, a secure gateway (SGW) 210, a packet data network gateway (PGW) 215, a policy and charging rules function (PCRF) 220, the IMS core, a home subscriber server (HSS) 225, an authentication, authorization, and accounting server (AAA) 230, and a network 235. Devices of the environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

Some implementations are described herein as being performed within a long-term evolution (LTE) network for explanatory purposes. Some implementations may be performed within a network that is not an LTE network, such as a third generation (3G) network or a 5G network.

The environment 200 may include an evolved packet system (EPS) that includes an LTE network and/or the EPC 115 (e.g., the 4G core network 115) that operate based on a third-generation partnership project (3 GPP) wireless communication standard. The LTE network may include a RAN that includes one or more RANs 110 that take the form of evolved Node Bs (eNBs) via which the user device 105 communicates with the EPC 115. The EPC 115 may include the MME 205, the SGW 210, the PGW 215, and the PCRF 220 to enable the user device 105 to communicate with the network 235 and/or the IMS core. The IMS core may include the HSS 225 and/or the AAA 230, and may manage device registration and authentication, session initiation, and/or other operations associated with user devices 105. The HSS 225 and/or the AAA 230 may reside in the EPC 115 and/or the IMS core.

The MME 205 includes one or more devices, such as one or more server devices, capable of managing authentication, activation, deactivation, and/or mobility functions associated with the user device 105. In some implementations, the MME 205 may perform operations relating to authentication of the user device 105. Additionally, or alternatively, the MME 205 may facilitate the selection of a particular SGW 210 and/or a particular PGW 215 to provide traffic to and/or from the user device 105. The MME 205 may perform operations associated with handing off the user device 105 from a first RAN 110 to a second RAN 110 when the user device 105 is transitioning from a first cell associated with the first RAN 110 to a second cell associated with the second RAN 110. Additionally, or alternatively, the MME 205 may select another MME (not pictured), to which the user device 105 should be handed off (e.g., when the user device 105 moves out of range of the MME 205).

The SGW 210 includes one or more devices capable of routing packets. For example, the SGW 210 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, the SGW 210 may aggregate traffic received from one or more RANs 110 associated with the LTE network, and may send the aggregated traffic to the network 235 (e.g., via the PGW 215) and/or other network devices associated with the EPC 115 and/or the IMS core. The SGW 210 may receive traffic from the network 235 and/or other network devices, and may send the received traffic to the user device 105 via the RAN 110. Additionally, or alternatively, the SGW 210 may perform operations associated with handing off the user device 105 to and/or from an LTE network.

The PGW 215 includes one or more devices capable of providing connectivity for the user device 105 to external packet data networks (e.g., other than the depicted EPC 115 and/or the LTE network). For example, the PGW 215 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, the PGW 215 may aggregate traffic received from one or more SGWs 210, and may send the aggregated traffic to the network 235. Additionally, or alternatively, the PGW 215 may receive traffic from the network 235, and may send the traffic to the user device 105 via the SGW 210 and the RAN 110. The PGW 215 may record data usage information (e.g., byte usage), and may provide the data usage information to the AAA 230.

The PCRF 220 includes one or more devices, such as one or more server devices, capable of providing policy control decision and flow-based charging control functionalities. For example, the PCRF 220 may provide network control regarding service data flow detection, gating, and/or quality of service (QoS) and flow-based charging, among other examples. In some implementations, the PCRF 220 may determine how a certain service data flow is to be treated, and may ensure that user plane traffic mapping and treatment is in accordance with a user subscription profile.

The HSS 225 includes one or more devices, such as one or more server devices, capable of managing (e.g., receiving, generating, storing, processing, and/or providing) information associated with the user device 105. For example, the HSS 225 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 225 may provide this information to one or more other devices of the environment 200 to support the operations performed by those devices.

The AAA 230 includes one or more devices, such as one or more server devices, that perform authentication, authorization, and/or accounting operations for communication sessions associated with the user device 105. For example, the AAA 230 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 235 includes one or more wired and/or wireless networks. For example, the network 235 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 3 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

FIG. 3 is a diagram of an example environment 300 in which systems and/or methods described herein may be implemented. As shown in FIG. 3, the example environment 300 may include the user device 105, the RAN 110, the 5G core network 115, and a data network 345. Details of the user device 105 and the RAN 110 are provided elsewhere herein. Devices and/or networks of the example environment 300 may interconnect via wired connections, wireless connections, or a combination of wired and wireless connections.

In some implementations, the 5G core network 115 may include an example functional architecture in which systems and/or methods described herein may be implemented. For example, the 5G core network 115 may include an example architecture of a 5G next generation (NG) core network included in a 5G wireless telecommunications system. While the example architecture of the 5G core network 115 shown in FIG. 3 may be an example of a service-based architecture, in some implementations, the 5G core network 115 may be implemented as a reference-point architecture and/or a 4G core network, among other examples.

As shown in FIG. 3, the 5G core network 115 may include a number of functional elements. The functional elements may include, for example, the AMF 120, a network slice selection function (NSSF) 305, an AUSF 310, a unified data management (UDM) component 315, a policy control function (PCF) 320, an application function (AF) 325, a session management function (SMF) 330, and/or a user plane function (UPF) 335. The functional elements may be communicatively connected via a message bus 340. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The AMF 120 includes one or more devices that act as a termination point for non-access stratum (NAS) signaling and/or mobility management, among other examples.

The NSSF 305 includes one or more devices that select network slice instances for the user device 105. By providing network slicing, the NSSF 305 allows an operator to deploy multiple substantially independent end-to-end networks potentially with the same infrastructure. In some implementations, each slice may be customized for different services.

The AUSF 310 includes one or more devices that act as an authentication server and support the process of authenticating the user device 105 in the wireless telecommunications system.

The UDM 315 includes one or more devices that store user data and profiles in the wireless telecommunications system. The UDM 315 may be used for fixed access and/or mobile access in the 5G core network 115.

The PCF 320 includes one or more devices that provide a policy framework that incorporates network slicing, roaming, packet processing, and/or mobility management, among other examples.

The AF 325 includes one or more devices that support application influence on traffic routing, access to a network exposure function (NEF), and/or policy control, among other examples.

The SMF 330 includes one or more devices that support the establishment, modification, and release of communication sessions in the wireless telecommunications system. For example, the SMF 330 may configure traffic steering policies at the UPF 335 and/or may enforce user equipment IP address allocation and policies, among other examples.

The UPF 335 includes one or more devices that serve as an anchor point for intraRAT and/or interRAT mobility. The UPF 335 may apply rules to packets, such as rules pertaining to packet routing, traffic reporting, and/or handling user plane QoS, among other examples.

The message bus 340 represents a communication structure for communication among the functional elements. In other words, the message bus 340 may permit communication between two or more functional elements.

The data network 345 includes one or more wired and/or wireless data networks. For example, the data network 345 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example environment 300 may perform one or more functions described as being performed by another set of devices of the example environment 300.

Figure 4:
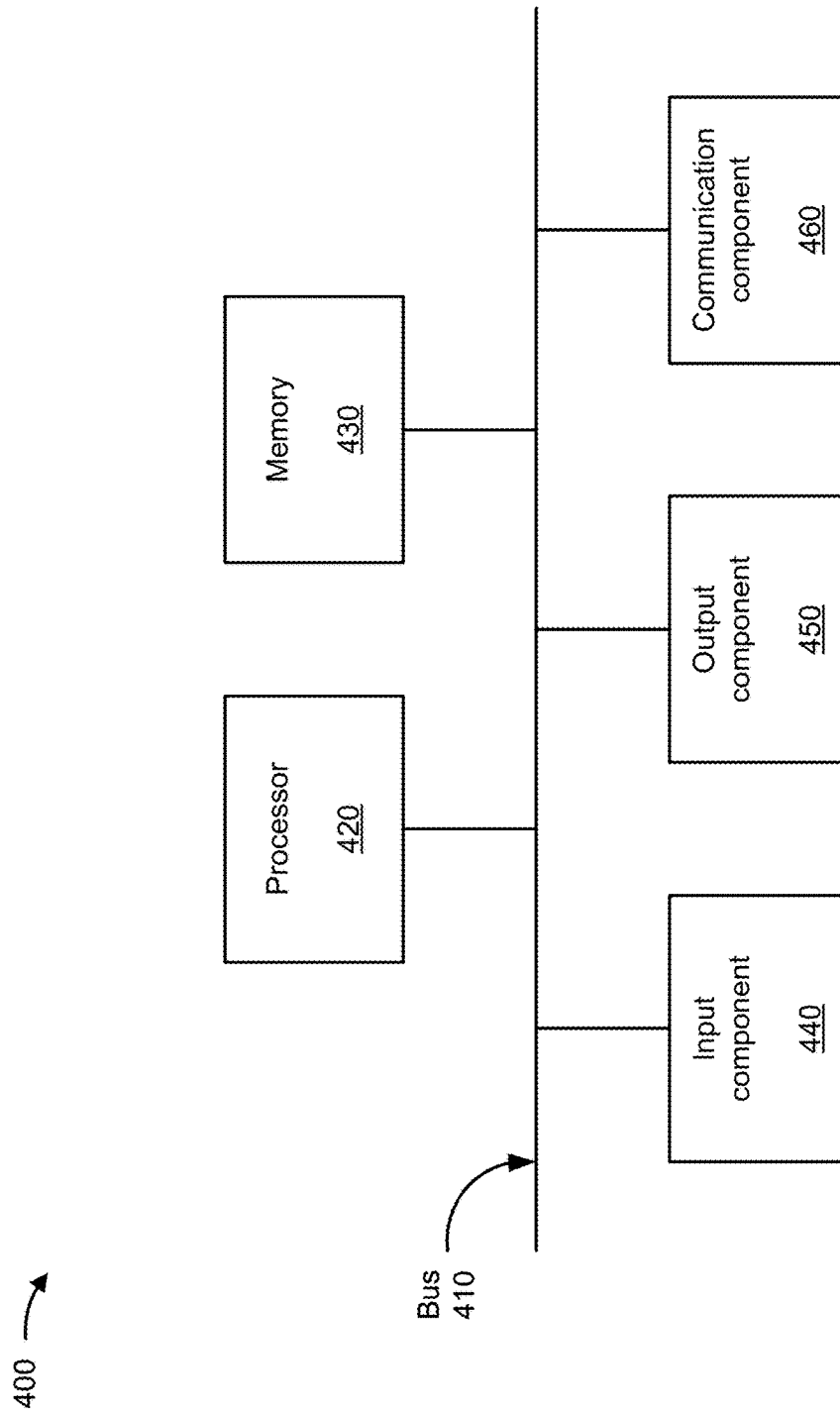
FIG. 4 is a diagram of example components of one or more devices of FIGS. 2 and 3.

FIG. 4 is a diagram of example components of a device 400, which may correspond to the user device 105, the RAN 110, the AMF 120, the MME 205, the SGW 210, the PGW 215, the PCRF 220, the HSS 225, the AAA 230, the NSSF 305, the AUSF 310, the UDM 315, the PCF 320, the AF 325, the SMF 330, and/or the UPF 335. In some implementations, the user device 105, the RAN 110, the AMF 120, the MME 205, the SGW 210, the PGW 215, the PCRF 220, the HSS 225, the AAA 230, the NSSF 305, the AUSF 310, the UDM 315, the PCF 320, the AF 325, the SMF 330, and/or the UPF 335 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
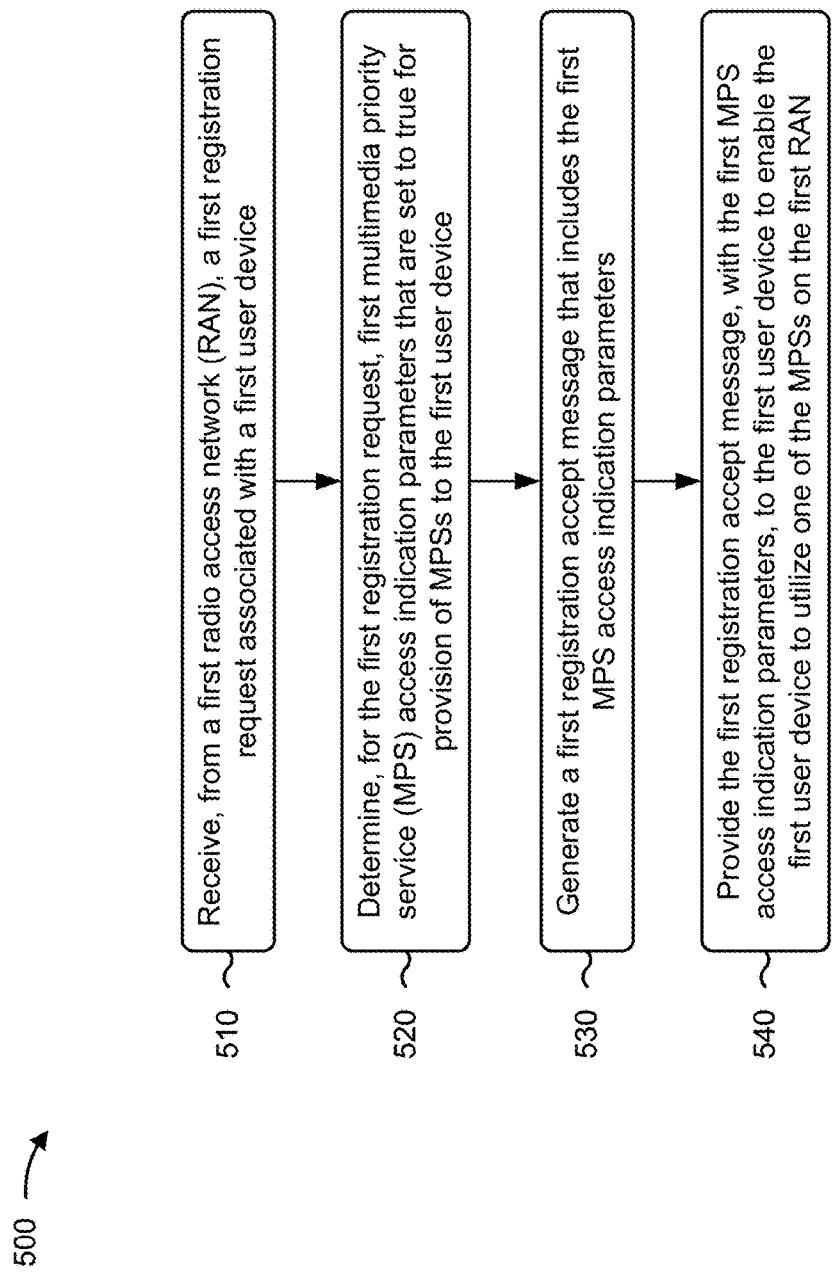
FIG. 5 is a flowchart of an example process for providing a RAN fallback for MPSs.

FIG. 5 is a flowchart of an example process 500 for providing a RAN fallback for MPSs. In some implementations, one or more process blocks of FIG. 5 may be performed by a network device (e.g., the AMF 120). In some implementations, one or more process blocks of FIG. 5 may be performed by another device or a group of devices separate from or including the network device, such as an SGW (e.g., the SGW 210), a PCRF (e.g., the PCRF 220), an HSS (e.g., the HSS 225), a PCF (e.g., the PCF 320), and/or a UPF (e.g., the UPF 335). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving, from a first RAN, a first registration request associated with a first user device (block 510). For example, the network device may receive, from a first RAN, a first registration request associated with a first user device, as described above. In some implementations, the first RAN is associated with an event that causes congestion for the first RAN. In some implementations, the first RAN is associated with a fifth-generation core network. In some implementations, the network device is an AMF of a 5G core network. In some implementations, the first user device is associated with a priority subscriber for the MPSs.

As further shown in FIG. 5, process 500 may include determining, for the first registration request, first MPS access indication parameters that are set to true for provision of MPSs to the first user device (block 520). For example, the network device may determine, for the first registration request, first MPS access indication parameters that are set to true for provision of MPSs to the first user device, as described above. In some implementations, the first MPS access indication parameters include one or more of a first parameter indicating that the first user device is provisioned for MPS IMS voice or video over a PS session supported over 3GPP access, a second parameter indicating that the first user device is provisioned for MPS IMS voice or video over a PS session supported over non-3GPP access, a third parameter indicating that the first user device is provisioned for MPS data supported over 3GPP access, or a fourth parameter indicating that the first user device is provisioned for MPS text supported over 3GPP access.

As further shown in FIG. 5, process 500 may include generating a first registration accept message that includes the first MPS access indication parameters (block 530). For example, the network device may generate a first registration accept message that includes the first MPS access indication parameters, as described above.

As further shown in FIG. 5, process 500 may include providing the first registration accept message, with the first MPS access indication parameters, to the first user device to enable the first user device to utilize one of the MPSs on the first RAN (block 540). For example, the network device may provide the first registration accept message, with the first MPS access indication parameters, to the first user device to enable the first user device to utilize one of the MPSs on the first RAN, as described above. In some implementations, the one of the MPSs includes MPS IMS voice or video over a PS session supported over 3GPP access, MPS IMS voice or video over a PS session supported over non-3GPP access, MPS data supported over 3GPP access, or MPS text supported over 3GPP access.

In some implementations, process 500 includes receiving, from the first RAN, a second registration request associated with a second user device; determining, for the second registration request, second MPS access indication parameters, where one or more of the second MPS access indication parameters are set to false for provision of the MPSs to the second user device; generating a second registration accept message that includes the second MPS access indication parameters; and providing the second registration accept message, with the second MPS access indication parameters, to the second user device.

In some implementations, the one or more of the second MPS access indication parameters being set to false enables the second user device to switch to a second RAN for utilization of one of the MPSs. In some implementations, the second RAN is associated with a fourth-generation core network.

In some implementations, the second MPS access indication parameters include one or more of a first parameter indicating that the second user device is not provisioned for MPS IMS voice or video over a PS session supported over 3GPP access, a second parameter indicating that the second user device is not provisioned for MPS IMS voice or video over a PS session supported over non-3GPP access, a third parameter indicating that the second user device is not provisioned for MPS data supported over 3GPP access, or a fourth parameter indicating that the second user device is not provisioned for MPS text supported over 3GPP access. In some implementations, the second user device is associated with a non-priority subscriber.

In some implementations, process 500 includes prioritizing the first user device utilization of the one of the MPSs on the first RAN over non-priority communications.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device and from a first radio access network (RAN), a first registration request associated with a first user device, wherein a plurality of MPSs are configured to operate with the first RAN;

determining, by the network device and for the first registration request, first multimedia priority service (MPS) access indication parameters that are set to true for provision of the plurality of MPSs to the first user device;

generating, by the network device, a first registration accept message that includes the first MPS access indication parameters; and providing, by the network device, the first registration accept message, with the first MPS access indication parameters, to the first user device to enable the first user device to utilize one of the plurality of MPSs on the first RAN.

2. The method of claim 1, further comprising:

receiving, from the first RAN, a second registration request associated with a second user device;

determining, for the second registration request, second MPS access indication parameters,
wherein one or more of the second MPS access indication parameters are set to false for provision of the plurality of MPSs to the second user device;

generating a second registration accept message that includes the second MPS access indication parameters; and providing the second registration accept message, with the second MPS access indication parameters, to the second user device.

3. The method of claim 2, wherein the one or more of the second MPS access indication parameters being set to false enables the second user device to switch to a second RAN for utilization of one of the plurality of MPSs.

4. The method of claim 3, wherein the second RAN is associated with a fourth-generation core network.

5. The method of claim 2, wherein the second MPS access indication parameters include one or more of:

a first parameter indicating that the second user device is not provisioned for MPS Internet protocol multimedia subsystem (IMS) voice or video over a packet switched (PS) session supported over Third Generation Partnership Project (3GPP) access, a second parameter indicating that the second user device is not provisioned for MPS IMS voice or video over a PS session supported over non-3GPP access, a third parameter indicating that the second user device is not provisioned for MPS data supported over 3GPP access, or a fourth parameter indicating that the second user device is not provisioned for MPS text supported over 3GPP access.

6. The method of claim 2, wherein the second user device is associated with a non-priority subscriber.

7. The method of claim 1, wherein the first RAN is associated with an event that causes congestion for the first RAN.

8. A network device, comprising:
one or more processors configured to:
receive, from a first radio access network (RAN), a first registration request associated with a first user device, wherein a plurality of MPSs are configured to operate with the first RAN,
wherein the first RAN is associated with an event that causes congestion for the first RAN;
determine, for the first registration request, first multimedia priority service (MPS) access indication parameters that are set to true for provision of the plurality of MPSs to the first user device;

generate a first registration accept message that includes the first MPS access indication parameters; and provide the first registration accept message, with the first MPS access indication parameters, to the first user device to enable the first user device to utilize one of the plurality of MPSs on the first RAN.

9. The network device of claim 8, wherein the first RAN is associated with a fifth-generation core network.

10. The network device of claim 8, wherein the first MPS access indication parameters include one or more of:

a first parameter indicating that the first user device is provisioned for MPS Internet protocol multimedia subsystem (IMS) voice or video over a packet switched (PS) session supported over Third Generation Partnership Project (3GPP) access, a second parameter indicating that the first user device is provisioned for MPS IMS voice or video over a PS session supported over non-3GPP access, a third parameter indicating that the first user device is provisioned for MPS data supported over 3GPP access, or a fourth parameter indicating that the first user device is provisioned for MPS text supported over 3GPP access.

11. The network device of claim 8, wherein the network device is an access and mobility management function of a fifth-generation core network.

12. The network device of claim 8, wherein the first user device is associated with a priority subscriber for the plurality of MPSs.

13. The network device of claim 8, wherein the one or more processors are further configured to:

prioritize the first user device utilization of the one of the plurality of MPSs on the first RAN over non-priority communications.

14. The network device of claim 8, wherein the one of the plurality of MPSs includes one of:

MPS Internet protocol multimedia subsystem (IMS) voice or video over a packet switched (PS) session supported over Third Generation Partnership Project (3GPP) access, MPS IMS voice or video over a PS session supported over non-3GPP access, MPS data supported over 3GPP access, or MPS text supported over 3GPP access.

15. A non-transitory computer-readable medium storing a set of instructions, the set of instructions comprising:

one or more instructions that, when executed by one or more processors of a network device, cause the network device to:

receive, from a first radio access network (RAN), a first registration request associated with a first user device, wherein a plurality of MPSs are configured to operate with the first RAN;

determine, for the first registration request, first multimedia priority service (MPS) access indication parameters that are set to true for provision of the plurality of MPSs to the first user device;

generate a first registration accept message that includes the first MPS access indication parameters;

provide the first registration accept message, with the first MPS access indication parameters, to the first user device to enable the first user device to utilize one of the plurality of MPSs on the first RAN;

receive, from the first RAN, a second registration request associated with a second user device;
determine, for the second registration request, second MPS access indication parameters,
wherein one or more of the second MPS access indication parameters are set to false for provision of the plurality of MPSs to the second user device;
generate a second registration accept message that includes the second MPS access indication parameters; and
provide the second registration accept message, with the second MPS access indication parameters, to the second user device,
wherein the one or more of the second MPS access indication parameters being set to false enables the second user device to switch to a second RAN for utilization of one of the plurality of MPSs.

16. The non-transitory computer-readable medium of claim 15, wherein the second RAN is associated with a fourth-generation core network.

17. The non-transitory computer-readable medium of claim 15, wherein the second MPS access indication parameters include one or more of:
a first parameter indicating that the second user device is not provisioned for MPS Internet protocol multimedia subsystem (IMS) voice or video over a packet switched (PS) session supported over Third Generation Partnership Project (3GPP) access,
a second parameter indicating that the second user device is not provisioned for MPS IMS voice or video over a PS session supported over non-3GPP access,
a third parameter indicating that the second user device is not provisioned for MPS data supported over 3GPP access, or
a fourth parameter indicating that the second user device is not provisioned for MPS text supported over 3GPP access.

18. The non-transitory computer-readable medium of claim 15, wherein the second user device is associated with a non-priority subscriber.

19. The non-transitory computer-readable medium of claim 15, wherein the first RAN is associated with an event that causes congestion for the first RAN.

20. The non-transitory computer-readable medium of claim 15, wherein the first MPS access indication parameters include one or more of:
a first parameter indicating that the first user device is provisioned for MPS Internet protocol multimedia subsystem (IMS) voice or video over a packet switched (PS) session supported over Third Generation Partnership Project (3GPP) access,
a second parameter indicating that the first user device is provisioned for MPS IMS voice or video over a PS session supported over non-3GPP access,
a third parameter indicating that the first user device is provisioned for MPS data supported over 3GPP access, or
a fourth parameter indicating that the first user device is provisioned for MPS text supported over 3GPP access.

\* \* \* \* \*